United States Patent [19]

Aiyama

[11] Patent Number: 5,488,819
[45] Date of Patent: Feb. 6, 1996

[54] WEEDER WITH ROTARY SPIKES

[75] Inventor: Fumihiko Aiyama, Musashimurayama, Japan

[73] Assignee: Kioritz Corporation, Tokyo, Japan

[21] Appl. No.: 345,409

[22] Filed: Nov. 21, 1994

[30] Foreign Application Priority Data

Dec. 1, 1993 [JP] Japan ................. 5-064450 U

[51] Int. Cl.⁶ ........................... A01D 7/06; A01D 19/02
[52] U.S. Cl. ...................... 56/12.100; 56/400; 172/540
[58] Field of Search ............... 56/12.1, 400, 400.16, 56/400.02, 372; 172/378, 379, 540

[56] References Cited

U.S. PATENT DOCUMENTS

| 2,552,382 | 5/1951 | Root | 56/400.02 X |
|---|---|---|---|
| 3,205,643 | 9/1965 | Dunham | 56/400 X |
| 3,512,345 | 5/1970 | Smith | 56/400 X |
| 4,481,758 | 11/1984 | Fishbaugh | 56/400 |
| 4,601,163 | 7/1986 | Trelford | 56/16.7 |
| 5,014,504 | 5/1991 | Oechsle | 56/372 |
| 5,375,399 | 12/1994 | Kraft | 56/16.7 |

*Primary Examiner*—Stephen J. Novosad
*Attorney, Agent, or Firm*—Armstrong, Westerman, Hattori, McLeland & Naughton

[57] ABSTRACT

The weeder with rotary spikes in which the weeding operation is adequately and smoothly carried out in accordance with the type of weeds or the like to be weeded; power is effectively distributed without harmful effect to an engine and the like; maintenance work of the weeder is easily performed; and the overall weeding machine is simple in construction and is manufactured with low cost. The weeder with rotary spikes comprises: an operation rod; a gear case attached a tip portion of the operation rod; a rotary drum with a horizontally extending axis mounted to the tip portion of the operation rod through the gear case; and a spike mounting member with a number of spikes thereon detachably mounted to the rotary drum.

1 Claim, 3 Drawing Sheets 5,488,819

WEEDER WITH ROTARY SPIKES

BACKGROUND OF THE INVENTION

1. Field of the Invention

The present invention relates to a weeder with rotary spikes, and more particularly to a weeder with rotary spikes in which a spike mounting member is detachably attached to a rotary drum.

2. Description of the Related Art

Conventionally, it is known that a large weeder in which spikes made of steel or the like are secured to and project from an outer surface of a drum with a rotary shaft extending in the direction parallel to the ground, and the rotation of the spikes cause weeds or the like to be weeded. The above-mentioned large weeder is disclosed in U.S. Pat. Nos. 4,601,163 and 5,014,504.

In the construction of the weeder as described in these patents, unlike conventional weeders, rotary blades are not rotated on the plane parallel to the ground but spikes are rotated on the plane vertical to the ground. As a result, the weeded weeds or the like, sand, and the like are not liable to disperse, and cellular tissue of the weeds or the like is destroyed by the rotating force applied through the tips of the spikes, which restrains the weeds or the like from growing again.

SUMMARY OF THE INVENTION

In the aforementioned conventional weeder, however, since a rotary drum with spikes is securely built in the large weeder, it is not easy to replace the rotary drum and the spikes secured thereto and the same spikes must be used for the weeding operation regardless of the type of weeds or the like, resulting in difficult maintenance of the weeder as well as inefficient weeding operation. The present invention has been accomplished to eliminate the above drawbacks of the conventional weeder and to apply the aforementioned construction to a small weeder. It is therefore the object of the present invention is to provide a weeder in which the weeding operation is adequately and smoothly carried out in accordance with the type of weeds or the like to be weeded; power is effectively distributed without harmful effect to an internal combustion engine and the like as a power source; maintenance work of the weeder is easily performed; and the overall weeding machine is simple in construction and is manufactured with low cost.

The weeder with rotary spikes according to the present invention comprising an operation rod; a gear case attached a tip portion of the operation rod; a rotary drum with a horizontally extending axis mounted to the tip portion of the operation rod through the gear case; and spike mounting members with a number of spikes thereon detachably mounted to the rotary drum. Further, the spike mounting members may be detachably inserted into and secured to grooves formed on the rotary drum. Further, as another aspect of the present invention, the spike mounting members are inserted into the grooves from both end portions of the rotary drum and overlap with each other at a central portion of the rotary drum.

BRIEF DESCRIPTION OF THE DRAWINGS

The present invention will be more apparent from the detailed description with reference to the accompanying drawings wherein.

DETAILED DESCRIPTION OF PREFERRED EMBODIMENTS

A weeder with rotary spikes according to an embodiment of the present invention will be explained with reference to the accompanying drawings.

Figure 1:
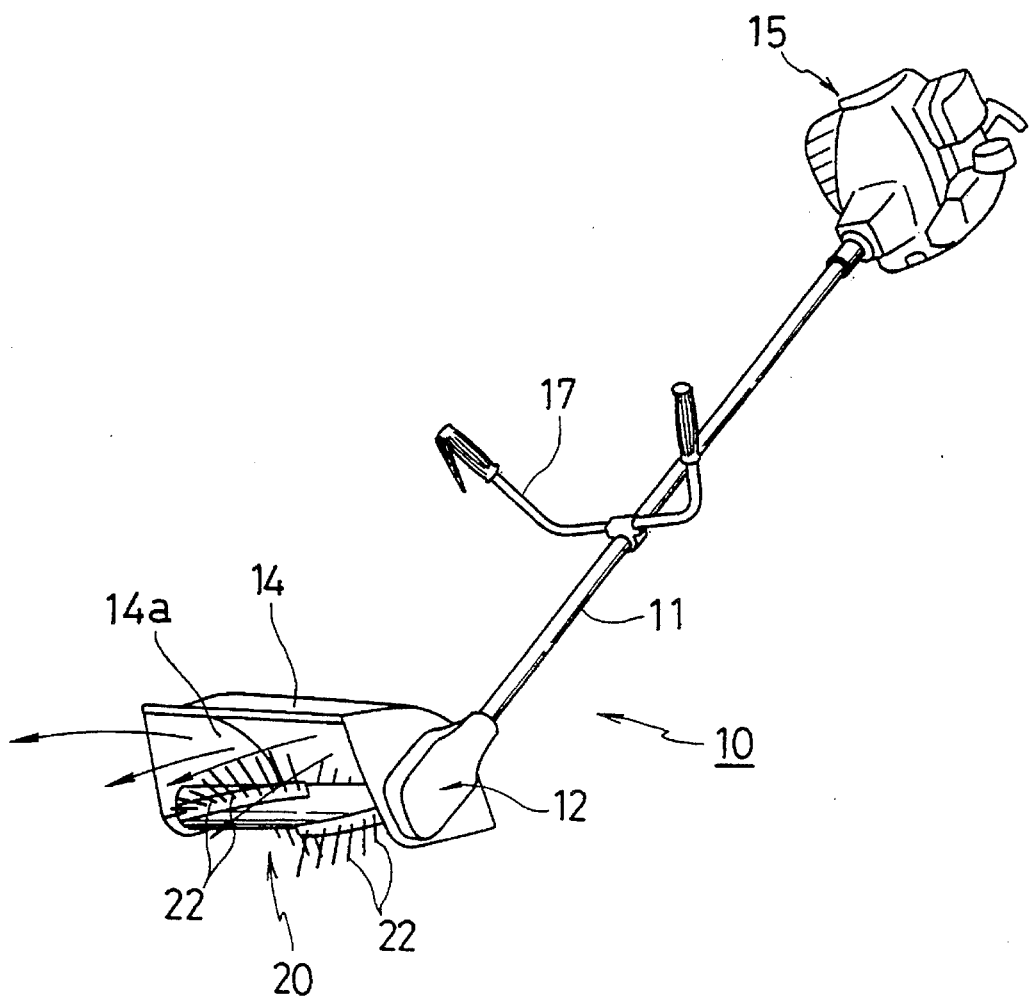
FIG. 1 is a general perspective view of a weeder with rotary spikes according to an embodiment of the present invention.

FIG. 1 is a general perspective view of the weeder with rotary spikes according to the embodiment of the present invention. In the weeder 10 illustrated in FIG. 1, an engine 15 such as a small air-cooled two-cycle gasoline engine is attached to an end of a light weight pipe-shaped operation rod 11 as a power source, and a gear case 12 is connected to another end (lower end) thereof.

The power of the engine 15 is transmitted through a drive shaft 16 housed in the operation rod 11 and bevel gears 23, 24 in the gear case 12 to a rotary drum 20 to which rod-shaped spikes 22 with appropriate resilience and wear resistance such as spring steel wire are attached at the surface of thereof in such a manner as to shape a comb. A safety cover 14 is secured to the gear case 12. The safety cover 14 extends from a connection portion of the gear case 12 and the rotary drum 20 to an outer end portion of the rotary drum 20, and is provided substantial sector side surfaces at both ends thereof, and is further provided with an upper and rear surface to enclose outer upper and rear rotation locus of the spikes 22. An operation handle 17 is attached to the operation rod 11 between the engine 15 and the gear case 12.

Figure 2:
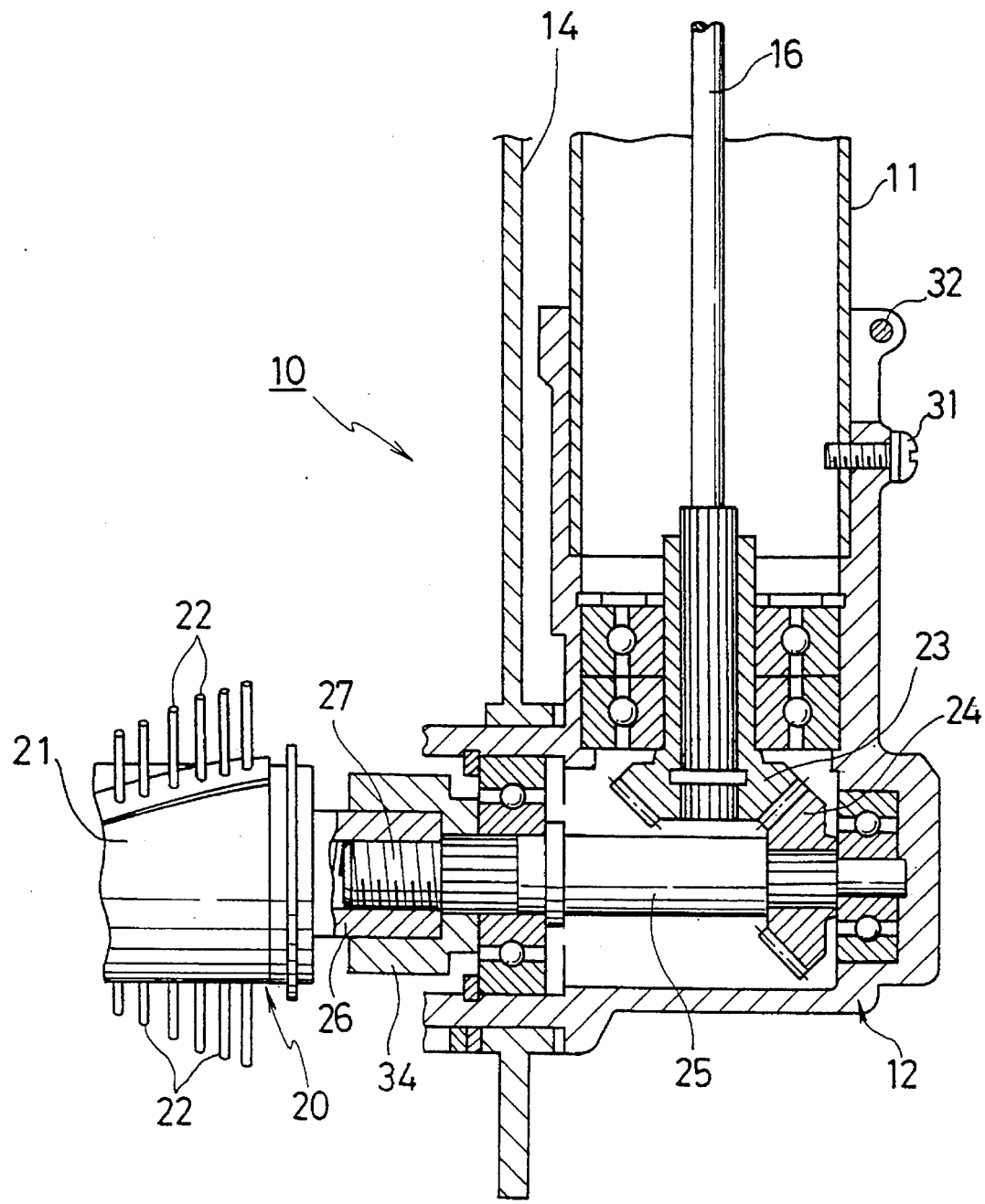
FIG. 2 is an enlarged lateral cross-sectional view of a primary portion of a gear case of the weeder with rotary spikes according to the embodiment of the present invention.

FIG. 2 is an enlarged lateral cross-sectional view of a primary portion of the gear case 12 of the weeder 10 with rotary spikes 22 according to the embodiment of the present invention.

The rotary drum 20 is mounted to the tip of the operation rod 11 through the gear case 12 with a shape of an elbow, which is secured to the operation rod 11 through a locking screw 31 and a fastening screw 32. The power of the engine 15 is transmitted to the rotary drum 20 through the drive shaft 16, the pair of bevel gears 23, 24 in the gear case 12, and a rotation shaft 25 horizontally extending in the direction perpendicular to the drive shaft 16. The rotary drum 20 is rotated in such a manner that weeds and the like which are destroyed by the spikes 22 are discharged from an upper part of a front opening 14a of the safety cover 14.

A cylindrical portion 26 integral to the rotary drum 20 is engaged with a threaded portion 27 of the rotation shaft 25 which projects in a hole of a receiver 34 connected to the rotation shaft 25 using splines so that the rotary drum 20 is rotatable together with the rotation shaft 25.

Figure 3:
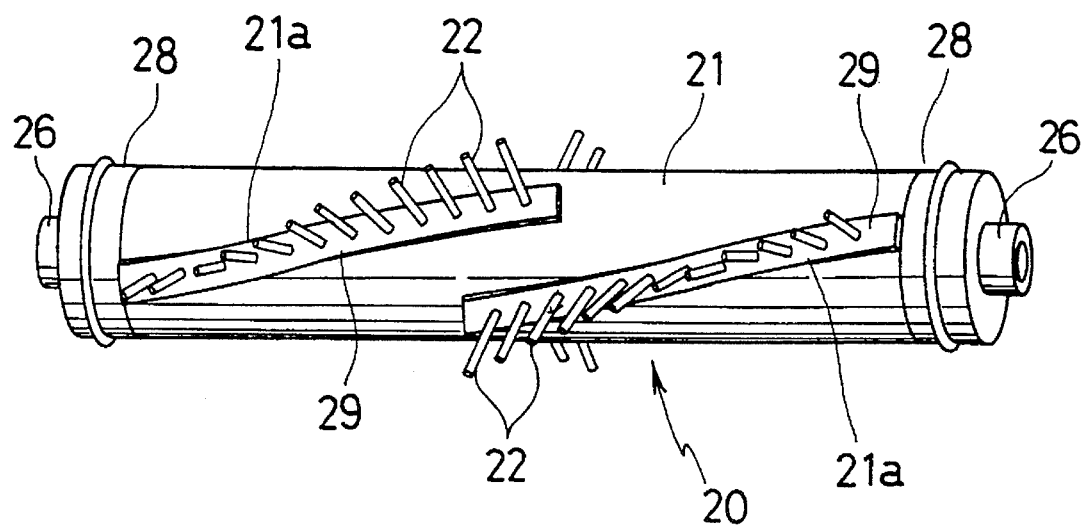
FIG. 3 is a general view of a rotary drum according to the embodiment of the present invention.
Figure 4:
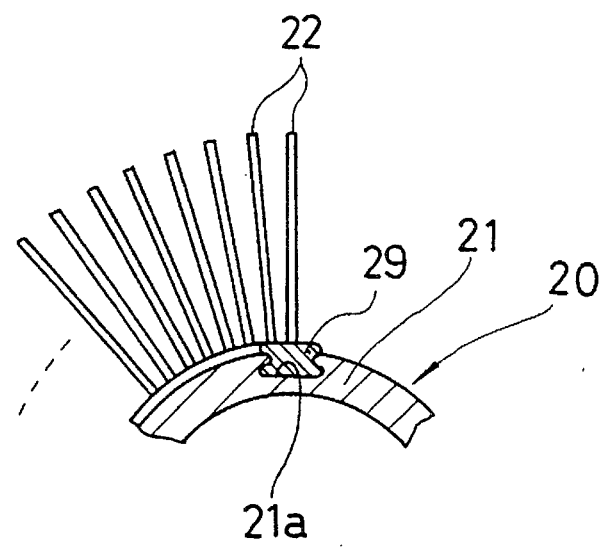
FIG. 4 is an enlarged cross-sectional view of the rotary drum shown in FIG. 3.

Next, the construction of the rotary drum 20 will be explained. FIG. 3 is a general perspective view of the rotary drum 20 and FIG. 4 is an enlarged cross-sectional view of the primary portion of the rotary drum 20 illustrated in FIG. 3. The rotary drum 20 comprises a main body 21 made of light-weight rigid material, a cap 28 with inner thread detachably mounted to the both ends of the main body 21, a number of spikes 22 radially project like a comb on the outer surface of the main body 21, a spike mounting member 29 secured to the main body 21 for mounting the spikes 22 on the outer surface of the main body 21 there-through.

The main body 21 is provided with dove tail grooves 21a extending from the ends to the central portion thereof to form gentle swirls as illustrated in FIG. 4. The spike mounting members 29 are inserted into the grooves 21a and secured therein. The spike mounting members 29 are mounted in such a manner that the spikes 22 mounted to those members 29 overlap with each other at the central portion of the main body 21 to prevent weeds near the central portion of the main body 21 from being unweeded.

The caps 28 attached to right and left ends of the main body 21 function as stoppers also for the spike mounting members 29.

With the above-mentioned construction, the spike mounting members 29 are replaceable with ease, and a variety of spikes 22 with different material, shape, number, mounting direction and the like, which are prepared in advance, are applicable to the weed or the like to be weeded with different density, height, hardness and the like, resulting in no harmful effect to the engine 15 and efficient power distribution.

While the invention has been particularly shown and described in reference to the one preferred embodiment thereof, it will be understood by those skilled in the art that changes in form and details may be made therein without departing from the spirit and scope of the invention as claimed.

For example, the spikes are disposed in two lines in the figures. But three or more rows of spikes may be used.

Further, a gear case of conventional grass trimmers may be used as it is. The rotary drum 20 may be mounted to both right and left sides of the gear case 12.

As clearly understood from the above explanation, with the construction according to the present invention, the weeding operation is adequately and smoothly carried out in accordance with the type of weeds or the like to be weeded; there is no harmful effect on the engine and the like to effectively distribute power therefrom; the maintenance work such as replacement of parts is carried out with ease; and the overall weeding machine is simple in construction and is manufactured with low cost.

What is claimed is:

1. A weeder with rotary spikes, comprising:

an operation rod (11);

a gear case (12) attached a tip portion of the operation rod (11);

a rotary drum (20) with a horizontally extending axis mounted to the tip portion of said operation rod (11) through said gear case (12); and a spike mounting member (29) with a plurality of spikes (22) thereon detachably mounted onto said rotary drum (20), wherein said spike mounting member (29) is detachably inserted into and secured to a groove (21a) formed on said rotary drum (20), and wherein said spike mounting members (29) are inserted into said grooves (21a) from both end portions of said rotary drum (20) and overlap each other at a central portion of said rotary drum (20).

* * * * *